(12) United States Patent
Huber (10) Patent No.: US 6,354,985 B2
(45) Date of Patent: *Mar. 12, 2002

(54) FOLD PATTERN

(75) Inventor: Franz Huber, Munich (DE)

(73) Assignee: Kartographie Huber, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/254,330

(22) PCT Filed: Sep. 4, 1997

(86) PCT No.: PCT/DE97/01949

§ 371 Date: Mar. 4, 1999

§ 102(e) Date: Mar. 4, 1999

(87) PCT Pub. No.: WO98/10400

PCT Pub. Date: Mar. 12, 1998

(30) Foreign Application Priority Data

Sep. 5, 1996 (DE) .......................... 196 36 069
Sep. 5, 1996 (DE) .......................... 196 36 070
Sep. 5, 1996 (DE) .......................... 196 36 071

(51) Int. Cl.⁷ ............................................. B31B 1/26
(52) U.S. Cl. .......................... 493/458; 283/34; 40/904
(58) Field of Search ................. 493/458, 162; 40/904; 253/34

(56) References Cited

U.S. PATENT DOCUMENTS

| 5,030,193 A | * | 7/1991 | Breton et al. ............... 493/458 |
| 5,217,257 A | * | 6/1993 | Knoors ........................ 493/162 |
| 5,348,526 A | * | 9/1994 | Feygin ........................ 493/458 |
| 5,397,292 A | * | 3/1995 | Deckers et al. ............. 493/458 |
| 6,010,122 A | * | 1/2000 | Weber ........................ 493/458 |

FOREIGN PATENT DOCUMENTS

| DE | 613532 | 8/1932 |
| DE | 1021191 | 6/1958 |
| DE | 8229992 | 1/1986 |
| DE | 8900414 | 6/1989 |
| EP | 329861 | 8/1989 |
| EP | 487470 | 5/1992 |
| FR | 613092 | 11/1926 |
| FR | 975762 | 3/1951 |
| GB | 2082503 | 3/1982 |

* cited by examiner

Primary Examiner—Eugene Kim
(74) Attorney, Agent, or Firm—Christie, Parker & Hale, LLP (57) ABSTRACT

In a map with a pattern of folding lines along which the map can be folded, it is easy to find geographical regions shown on the map due to two portions connected via a common center area and each having a plurality of folding lines in equidistant portions in a direction parallel to two parallel limiting lines, the map being folded on successive lines alternatingly in opposite directions so as to form a plurality of flaps.

2 Claims, 12 Drawing Sheets

FOLD PATTERN

FIELD OF THE INVENTION

This invention relates to a map with a pattern of folding lines along which the map can be folded.

BACKGROUND OF THE INVENTION

In maps of the abovementioned kind a pattern of folding lines serves to permit the map to be folded into a handy format. The disadvantage is that to find a certain point or certain region on the map it is necessary to unfold the map as a whole to have a general view of the whole region shown by the map.

The problem of the invention is to provide a map which can be viewed successively from east to west and from north to south or vice versa without the whole map having to be unfolded.

SUMMARY OF THE INVENTION

This problem is solved for a map of the abovementioned kind in that two portions connected via a common center area and each having a plurality of parallel folding lines are drawn in a direction parallel to two parallel limiting lines, the map being folded on successive lines alternatingly in opposite directions so as to form a plurality of flaps.

Preferred embodiments of the invention are the subject of the subclaims.

In the inventive map the width of the flaps can be disposed in equidistant portions or increase or decrease, or increase and decrease, with increasing distance from the center area. In the latter embodiment it is advantageous if the flap edges coming to lie near the center line of the center area lie one above the other, and the flap edges coming to lie near the side edges of the center area are successively offset laterally. Alternatively the map can be formed so that the flap edges coming to lie near the center line of the center area are successively offset laterally by a constant amount, and the flap edges coming to lie near the side edges of the center area lie one above the other.

Further it is possible to form the map so that the flap edges coming to lie near the center line of the center area are successively offset laterally by a constant amount, and the flap edges coming to lie near the side edges of the center area are also offset laterally by a constant amount, preferably the same constant amount. The common advantage of these embodiments is that the lateral offset of the flap edges makes an area of an adjacent flap visible which can be marked in color or in the form of numbers, symbols or letters. The order of these numbers and letters or a possible choice of color according to the rainbow thus makes it possible to relate the map contents shown on the flaps to the position of the geographical region shown in the flap area relative to the total geographical region depicted by the map.

According to preferred embodiments of the inventive map it can be provided that the flap edges coming to lie near the center line of the center area lie one above the other, and the flap edges coming to lie near the side edges of the center area come to lie at two different distances from the center line so as to create two classes of flaps of different width. This can be advantageous for special applications of the map or representations on the map.

It is likewise advantageous if the flaps are provided with information lines starting at right angles from the longitudinal axis of the center area and representing connections between informative remarks on the center area and corresponding reference areas on the areas of the flaps. This establishes an association of information given on the center area with corresponding areas on the areas of the flaps which show this information or explain it further.

With the inventive map it is possible and advantageous to dispose a plurality of center areas one above or below the other in order to enlarge the area of the total geographical region shown by the map. The special feature of this embodiment is the abovementioned marking of flaps with the aid of numbers, symbols or letters or in accordance with the colors of the rainbow which is advantageous in making such map flaps of two adjacent center areas which show adjacent geographical regions of the map especially easy and quick to find.

By disposing two or more center areas one above the other and forming a further corresponding folding line as a double folding line (two parallel folding lines spaced a few millimeters apart) one obtains an advantageous "book form" for the folded map, with a spine in the area of the double folding line on which a name can be printed. The map can thus be placed in a book shelf and found easily like a book. The title of the map can be integrated, so as to result automatically upon folding and not need to be additionally printed separately in the usual way.

When two or more center areas are disposed one above the other, the contact lines of the portions disposed one above the other are slitted so that it is possible to turn the individual flaps even when the two or more portions are folded up. One does not slit the second last lateral flaps or one of the previous flaps of each portion page to prevent the portions from falling apart. One does not slit a randomly placed center area or two or more connected center areas or the second last lateral flaps or one of the previous flaps of each portion page to prevent the portions from falling apart.

According to an important embodiment of the inventive map it is provided that the plurality of upper and lower flap edges coming to lie one above or below the other have an intermeshing edge form in order to permit geographical regions having the same longitude but different latitude to be found quickly. It can be provided that the intermeshing edges have a wavy form, the number of waves of an edge being given for the position of the flaps disposed one below or above the other within the total structure of flaps. Alternatively it can be provided that the intermeshing edges have the form of zigzag lines, the number of zigzag lines of an edge being given for the position of the flaps disposed one below or above the other within the total structure of flaps.

According to a further embodiment the center area or the plurality of center areas can be disposed off-center.

Obviously, the inventive map is also suitable for representing nongeographical structures.

The invention relates in addition to a map with a pattern of folding lines along which the map can be folded.

In maps of the abovementioned kind a pattern of folding lines serves to permit the map to be folded into a handy format. The disadvantage is that to find a certain point or area on the map it is necessary to unfold the map as a whole to have a general view of the whole region shown by the map.

The problem of the invention is further to provide a map which can be viewed successively from east to west and from north to south or vice versa without the whole map having to be unfolded.

A map with the inventive folding pattern can be either foldable unidirectionally, i.e. from left to right or from right to left in the hand of the viewer, or foldable bidirectionally, i.e. from left to right or from right to left and from top to bottom or from bottom to top in the hand of the viewer. With both unidirectionally and bidirectionally foldable maps it is desirable to be able to recognize the content of individual folding portions even in the folded state of the map if possible. For a unidirectionally foldable map with a pattern of folding lines along which the map can be folded, two portions connected via a common center area and each having a plurality of parallel folding lines being disposed in a direction parallel to two parallel limiting lines of the center area, the portions being folded in successive lines alternatingly in opposite directions so as to form a plurality of flaps, this problem is solved in that the length of the flaps decreases with the distance from the center area, or increases on the outer side.

The length of the flaps can thereby decrease linearly with the distance from the center area, or the length of the flaps can decrease with the distance from the center area by a given, constant amount in each case. These solutions have in common that a part of each portion remains unhidden by the other map portions in the folded state of the map so as to create a portion area which remains inspectable for the viewer of the folded map and on which information on the content of the particular portion can be provided. According to preferred embodiments of a map with such a folding line pattern, the center area is foldable along a center folding line, the center folding line being formed in particular as a strip provided with two parallel folding lines so that the map has the format of a book in the folded state.

A bidirectionally foldable map is provided according to the invention with a pattern of folding lines along which the map can be folded, at least two flaps connected via a common center area being provided which are each disposed laterally of two first parallel limiting lines of the center area, the center area and the flaps being foldable along a center folding line thereof and a plurality of maps being connected via second limiting lines of their respective center areas. The particular center areas of this map are preferably foldable along two perpendicular center folding lines, one of the center folding lines of the center area preferably being formed as a strip provided with two parallel folding lines.

In this inventive map four or more flaps connected via a common center area are preferably provided which are each disposed laterally of two first parallel limiting lines of the center area, the center area and each of the flaps being foldable along two perpendicular center folding lines thereof.

In addition it is preferably provided in this inventive map that at every second limiting line of the center area two map parts are provided which are connected with the center area and with one of the flaps via corresponding folding lines in each case.

Another bidirectionally foldable map is provided according to the invention with a pattern of folding lines along which the map can be folded, two portions connected via a common center area and each having a plurality of parallel folding lines being disposed in a direction parallel to two first parallel limiting lines of the center area, the map being folded on successive lines alternatingly in opposite directions so as to form a plurality of flaps, the center area being foldable along two perpendicular center folding lines, and the flaps each having at least one folding line extending parallel to one of the center lines of the center area and provided in sections with slits extending parallel to the other of the center lines of the center area.

In this inventive map, too, one of the center folding lines of the center area is preferably formed as a strip provided with two parallel folding lines.

In this inventive map the plurality of parallel folding lines can fundamentally be formed so that the folding lines are disposed in equidistant portions. In the folded state of the map a portion thus covers the one located in front of it.

Alternatively the plurality of parallel folding lines can be formed so that their distance from at least one edge of the flaps successively decreases or increases or alternatingly decreases and increases. This permits individual portion areas not to be covered by the portions disposed in front of them in the folded state of the map and thus to remain inspectable for a viewer of the map so that information can be provided on these areas on the content in the particular map portion. Such inspectable areas are also created by the distance of the plurality of parallel folding lines from at least one edge of the flaps alternatingly decreasing and increasing, this embodiment being advantageous in that it also permits large-area portions toward the edges of the map.

According to preferred embodiments of all inventive maps it is provided that at least one partial portion of at least one of the folding lines is formed as a perforated or slitted line or perforated or slitted double line.

It is alternatively provided according to preferred embodiments that a part of the map area contains at least one line perforated with holes or slits.

Said holes preferably have a diameter and spacing in the range of 0.1 mm to 3 mm, and said slits preferably have a length in the range of 0.2 mm to 12 mm and a spacing in the range of 0.1 mm to 3 mm.

The inventive map can for example be fastened to the back of a book or brochure between the pages of the book or brochure. A first part of the map can thereby be connected with the book via an area having a perforation line extending parallel to the back, and a second part of the map be foldable in the direction of the first part, thereby creating a foldable map which can be separated from the book or brochure. The first and second map parts can have further folding lines for folding the separable map further so that the latter can be made very small and find room in a shirt pocket for example. The map can contain preperforated or folded lines which are formed parallel and/or perpendicular to the direction of the perforation line of the area adjacent to the back.

The perforation holes preferably have a diameter and spacing in the range of 0.1 mm to 3 mm. Alternatively to perforation holes, the perforation line can have slits having a length in the range of 0.2 mm to 12 mm and spacing in the range of 0.1 mm to 3 mm.

The invention also relates to a map with a pattern of folding lines along which the map can be folded.

In maps of the abovementioned kind a pattern of folding lines serves to permit the map to be folded into a handy format. The disadvantage is that to find a certain point or area on the map it is necessary to unfold the map as a whole to have a general view of the whole region shown by the map.

The problem of the invention is also to provide a map which can be viewed successively from east to west or vice versa without the whole map having to be unfolded.

This problem is solved for a map of the abovementioned kind by a plurality of first equidistant parallel pairs of folding lines at a first distance apart between which second equidistant parallel pairs of folding lines at a second distance apart are disposed, the second distance being half as great as the first distance, and the second equidistant parallel pairs of folding lines being formed by a line of two successive first equidistant parallel pairs of folding lines, and the map being folded on the two folding lines of a second equidistant parallel pair of folding lines in the same or opposite directions so as to form pull-up flaps.

According to a preferred embodiment of the inventive map the folded map shows different geographical regions on its front and back. The possible utilization of the front and back of the inventive map makes it possible to accommodate a certain geographical region on a map whose dimensions are half as great as a map which can be printed only on its front by reason of its special folding.

According to a further preferred embodiment of the inventive map a central pair of folding lines of the first equidistant parallel pairs of folding lines is provided which is folded along its center line extending in the direction of the longitudinal axis. This permits the map to be folded so that the flap areas of a contiguous surface of the map form pull-up areas which can accommodate additional information or advertising information. According to a further preferred embodiment of the inventive map it is provided that the areas of the flaps formed by the second equidistant parallel pairs of folding lines contain additional information on the regions shown on the front or back of the map and/or advertising information. This makes it possible to show additional information or advertising information on certain geographical regions in the area of the places on the map where these regions are shown.

Obviously, maps with the inventive folding pattern are also suitable for representing nongeographical structures.

The invention furthermore relates to a map with a pattern of folding lines along which the map can be folded.

In maps Of the abovementioned kind a pattern of folding lines serves to permit the map to be folded into a handy format. The disadvantage is that to find a certain point or area on the map it is necessary to unfold the map as a whole to have a general view of the whole region shown by the map.

The problem of the invention is furthermore to provide a map which can be viewed successively from east to west or vice versa without the whole map having to be unfolded.

This problem is solved for a map of the abovementioned kind by two portions connected via a common center area and each having a plurality of first equidistant parallel pairs of folding lines at a first distance apart between which second equidistant parallel pairs of folding lines at a second distance apart are disposed, the second distance being half as great as the first distance, and the second equidistant parallel pairs of folding lines being formed by a line of two successive first equidistant parallel pairs of folding lines, and the map being folded on the two lines of a second equidistant parallel pair of folding lines in opposite directions so as to form pull-up flaps, the two portions connected via a common center area being folded in opposite directions.

According to a preferred embodiment of the inventive map the folded map shows different geographical regions on its front and back. The possible utilization of the front and back of the inventive map makes it possible to accommodate a certain geographical region on a map whose dimensions are half as great as a map which can be printed only on its front by reason of its special folding.

According to a further preferred embodiment of the inventive map the areas of the flaps formed by the second equidistant parallel pairs of folding lines contain additional information on the regions shown on the front or back of the map and/or advertising information. This makes it possible to show information or advertising information on certain geographical regions in the area of the places on the map where these regions are shown.

The flap edges coming to lie near the center area can lie one above the other and be laterally offset from the two parallel limiting lines of the center area by a constant amount. The center area can be formed as the back wall of a book.

BRIEF DESCRIPTION OF THE DRAWINGS

In the following the inventive folding pattern will be explained with reference to a preferred embodiment shown in the figures of the drawing, in which.

DETAILED DESCRIPTION

Figure 1:
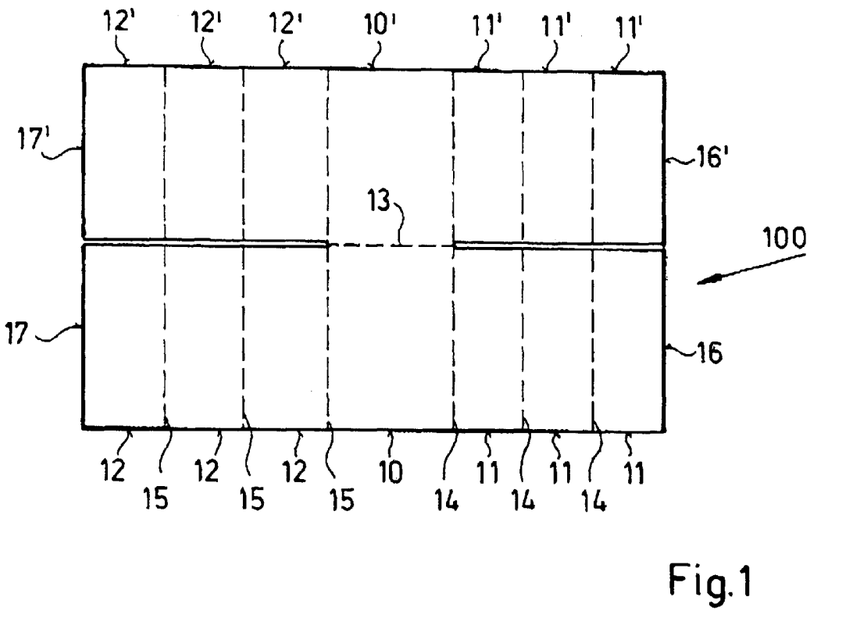
FIG. 1 shows an embodiment of the inventive map in a plan view.
Figure 1B:
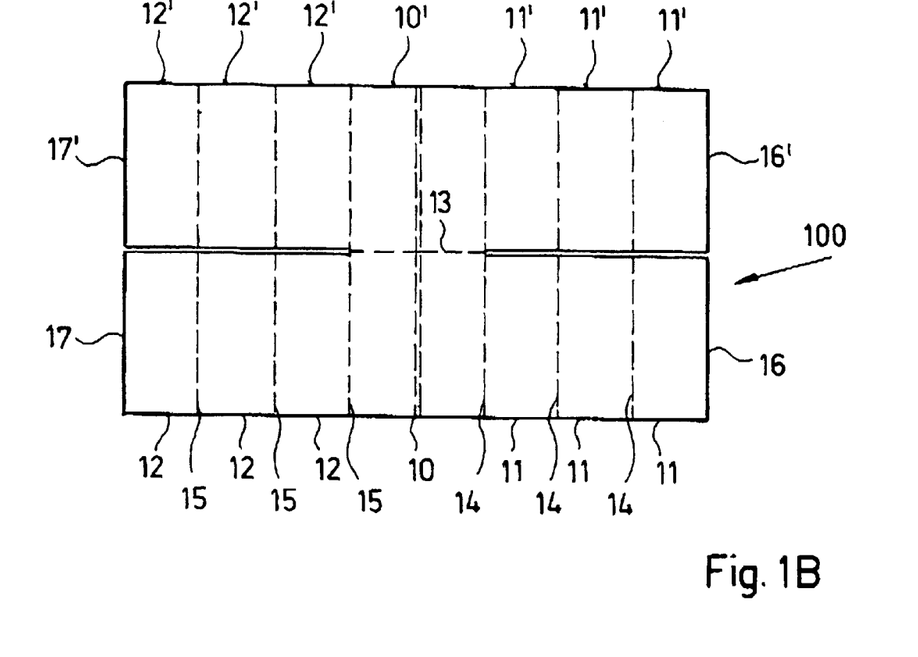
FIG. 1B shows a plan view of the embodiment of the inventive map shown in FIG. 1 with a double strip forming the back wall of a book.

In inventive map 100 shown in FIG. 1 two center areas 10, 10' are interconnected along common folding line 13. Adjacent to center area 10 laterally is a map part containing a plurality of folding lines in equidistant portions in a direction parallel to limiting lines 16, 17, the map being folded on successive lines alternatingly in opposite directions so as to a form a plurality of flaps 11. Adjacent on the other side is accordingly a map part containing a plurality of folding lines 15 in equidistant portions in a direction parallel to the two limiting lines 16, 17, the map being folded on successive lines alternatingly in opposite directions so as to form a plurality of flaps 12. This folding line and folding pattern applies accordingly to center area 10', the reference numbers with a prime being identical to the respective designations for center area 10.

Figure 2:
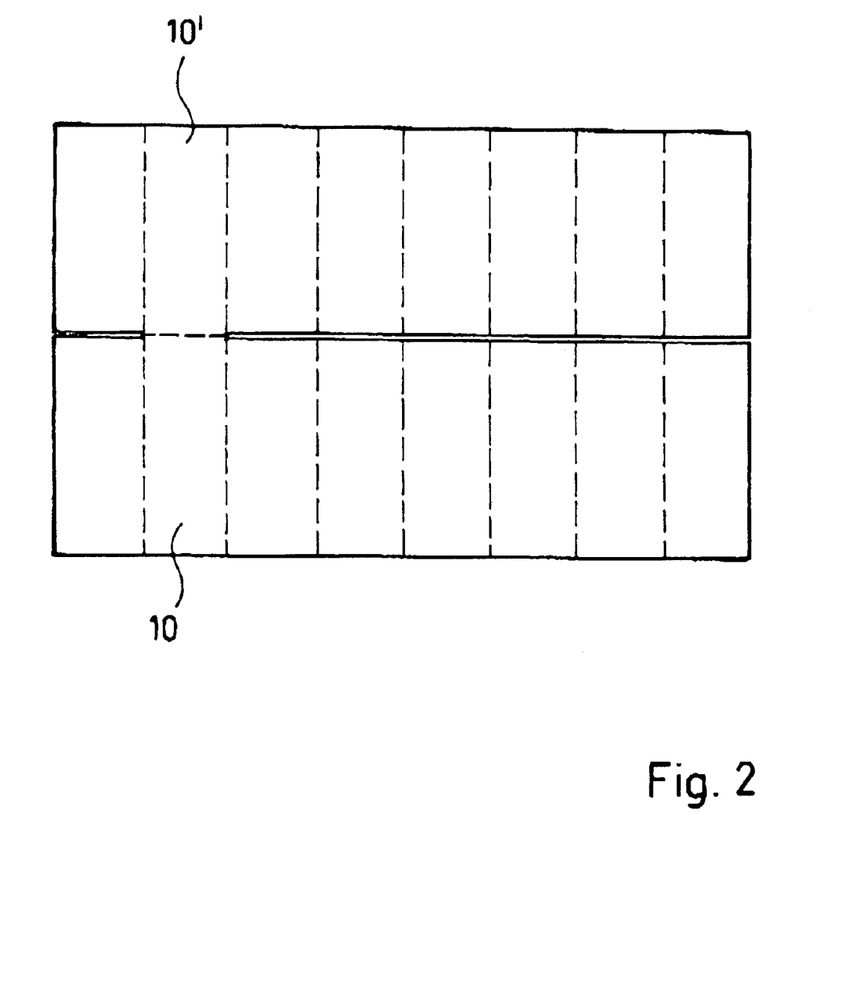
FIG. 2 shows a further embodiment of the inventive map in a plan view.

In inventive map 100 shown in FIG. 2 center area 10, 10' is disposed off-center. Otherwise this embodiment corresponds to that shown in FIG. 1.

Figure 3:
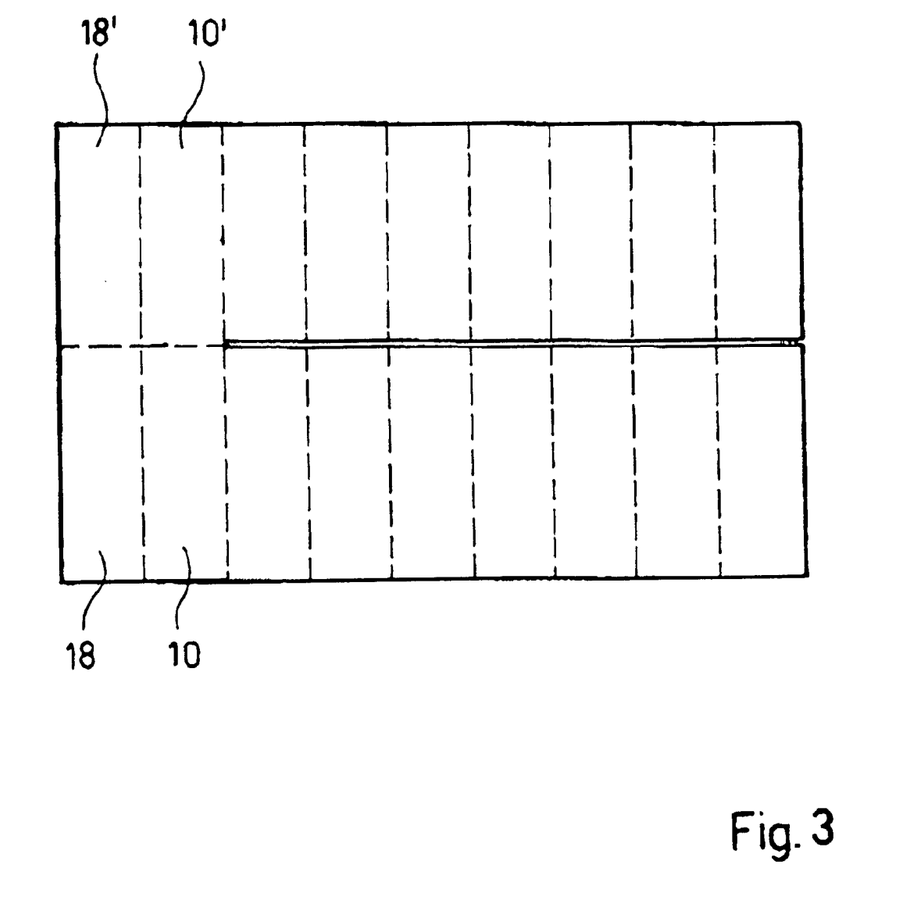
FIG. 3 shows a further embodiment of the inventive map in a plan view.
Figure 4:
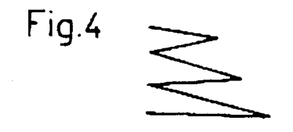
FIG. 4 shows a part of an embodiment of the inventive map in a cross-sectional view.
Figure 5:
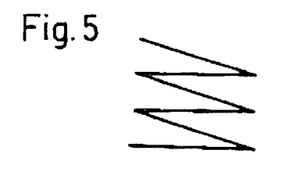
FIG. 5 shows a part of another embodiment of the inventive map in a cross-sectional view.
Figure 6:
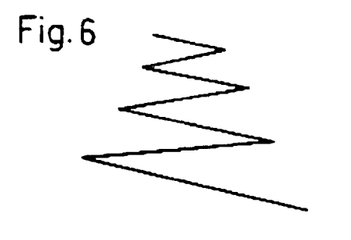
FIG. 6 shows a part of another embodiment of the inventive map in a cross-sectional view.
Figure 7:
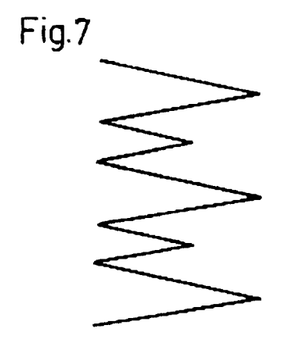
FIG. 7 shows a part of another embodiment of the inventive map in a cross-sectional view.
Figure 8:
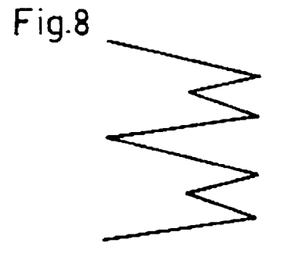
FIG. 8 shows a part of another embodiment of the inventive map in a cross-sectional view.
Figure 9:
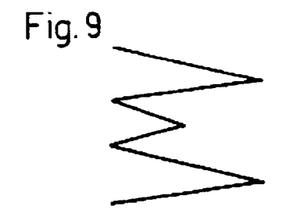
FIG. 9 shows a part of another embodiment of the inventive map in a cross-sectional view.
Figure 10:
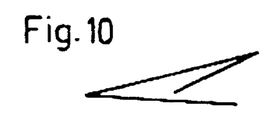
FIG. 10 shows a part of another embodiment of the inventive map in a cross-sectional view.
Figure 11:
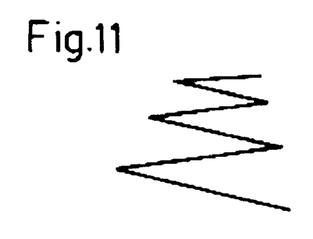
FIG. 11 shows a part of another embodiment of the inventive map in a cross-sectional view.
Figure 12:
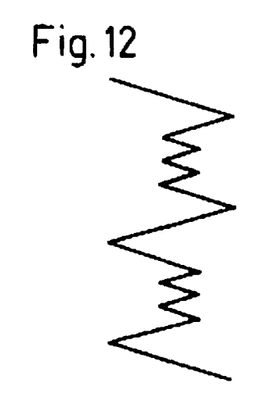
Figure 13:
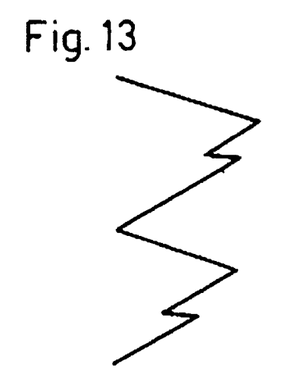
FIG. 13 shows a part of another embodiment of the inventive map in a cross-sectional view.
Figure 14:
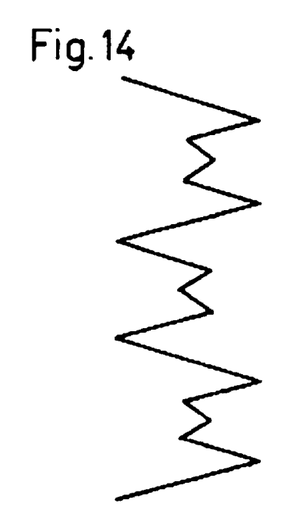
FIG. 14 shows a part of another embodiment of the inventive map in a cross-sectional view.

In inventive map 100 shown in FIG. 3 center area 10, 10' is disposed at the edge of the map and has cardboard cover 18, 18'. Otherwise this embodiment corresponds to that shown in FIG. 1.

FIGS. 4 to 14 show various embodiments of the inventive map which correspond to subclaims 2 to 9 or are further preferred modifications thereof.

Figure 15:
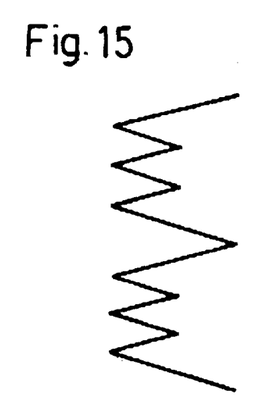
FIG. 15A shows a preferred embodiment of a map with the inventive folding pattern in a view from above.
FIG. 15B shows the map shown in FIG. 15A in a side view.
Figure 15A:
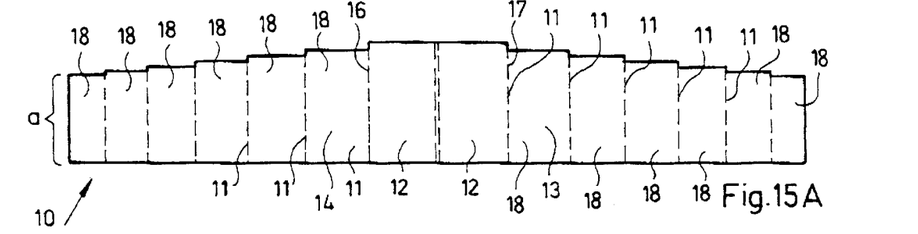
Figure 15B:
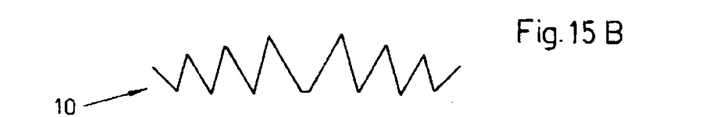

The map shown in FIGS. 15A and 15B has a pattern of folding lines 11 along which the map can be folded, two portions 13, 14 connected via common center area 12 and each having a plurality of parallel folding lines 11 being disposed in a direction parallel to two parallel limiting lines 16, 17 of center area 12, the portions being foldable on successive lines 11 alternatingly in opposite directions so as to form a plurality of flaps, length a of the flaps decreasing by a constant given amount in each case with the distance from the center area.

Figure 16A:
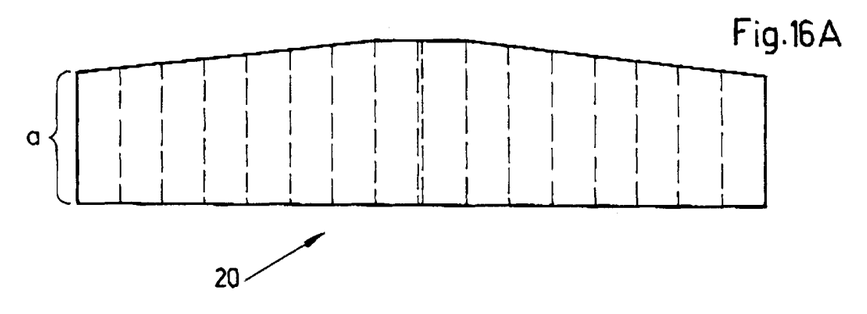
FIG. 16A shows another preferred embodiment of a map with the inventive folding pattern in a view from above.
Figure 16B:
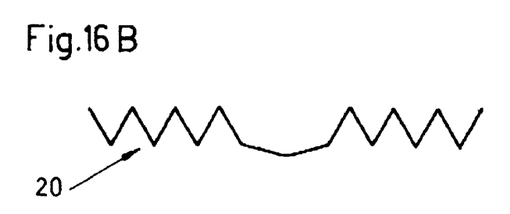
FIG. 16B shows the map shown in FIG. 16A in a side view.

The map shown in FIGS. 16A and 16B is substantially identical with the map shown in FIGS. 15A and 15B, the reference signs being increased by the number 10. In contrast to the map shown in FIGS. 15A and 15B, length a of the flaps decreases linearly in this map with the distance from the center area.

Figure 17A:
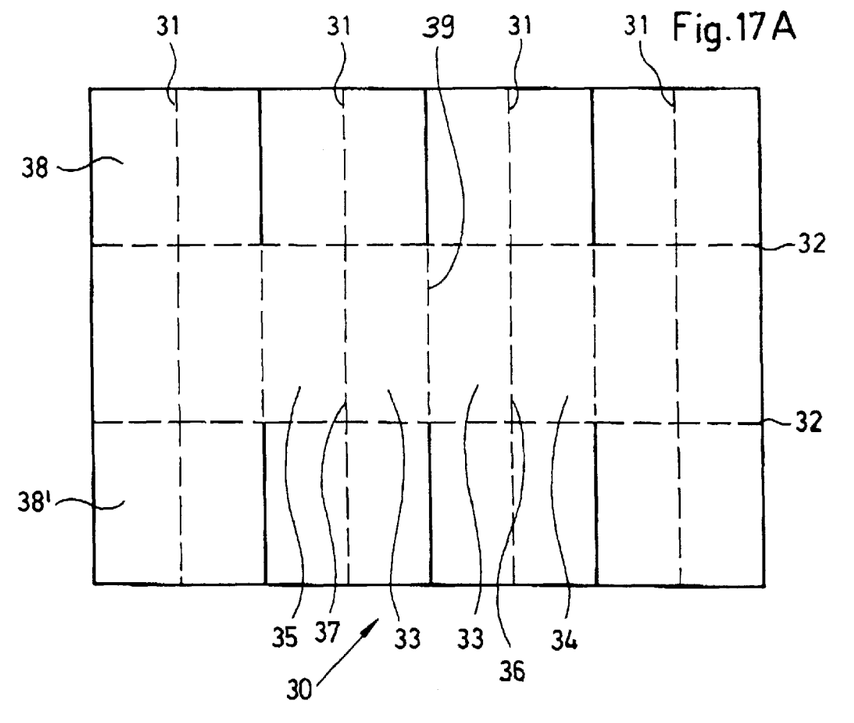
FIG. 17A shows a further preferred embodiment of a map with the inventive folding pattern in a view from above.
Figure 17B:
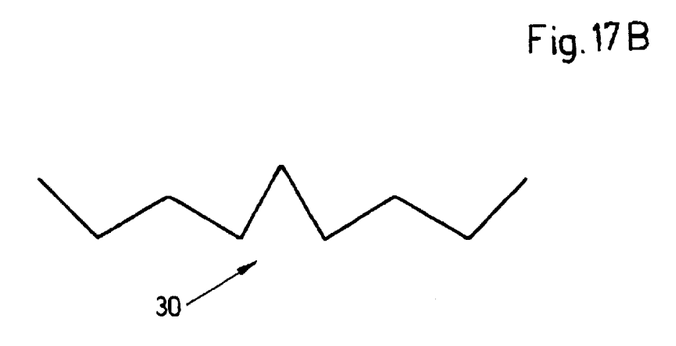
FIG. 17B shows the map shown in FIG. 17A in a side view.

The map shown in FIGS. 17A and 17B has a pattern of folding lines 31, 32 along which the map can be folded, at least two flaps 34, 35 connected via common center area 33 being provided which are each disposed laterally of two first parallel limiting lines 36, 37 of the center area, center area 33 and flaps 34, 35 being foldable along center folding line 39 thereof, and a plurality of maps 38, 38' being connected via second limiting lines 32 of their respective center areas.

Figure 18A:
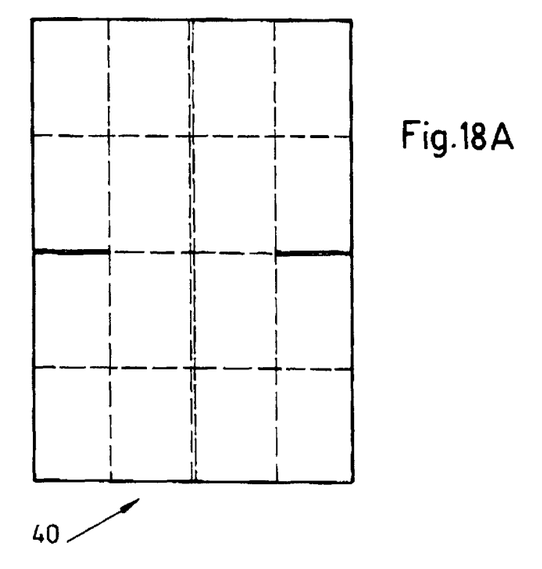
FIG. 18A shows a further preferred embodiment of a map with the inventive folding pattern in a view from above.
Figure 18B:
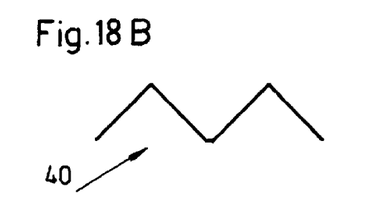
FIG. 18B shows the map shown in FIG. 18A in a side view.
Figure 19A:
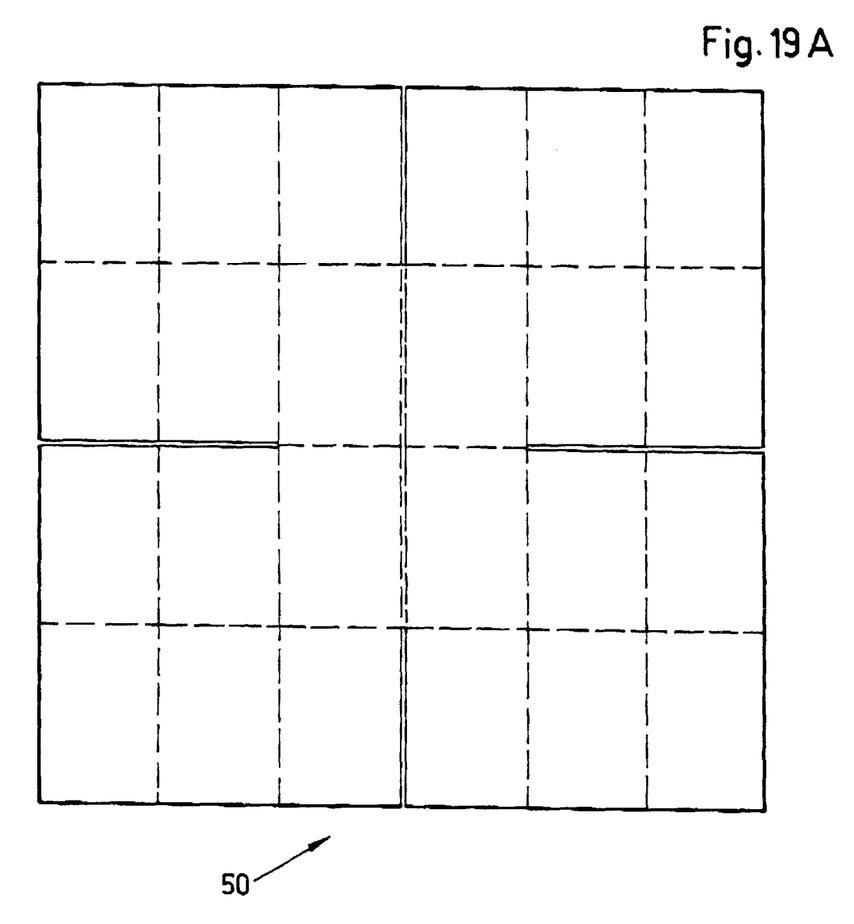
FIG. 19A shows a further preferred embodiment of a map with the inventive folding pattern in a view from above.
Figure 19B:
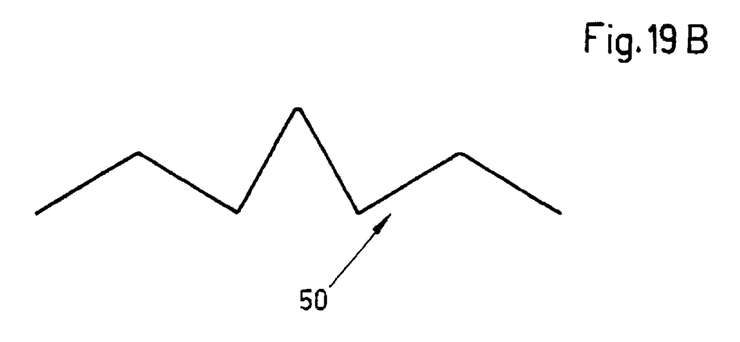
FIG. 19B shows the map shown in FIG. 19A in a side view.
Figure 20A:
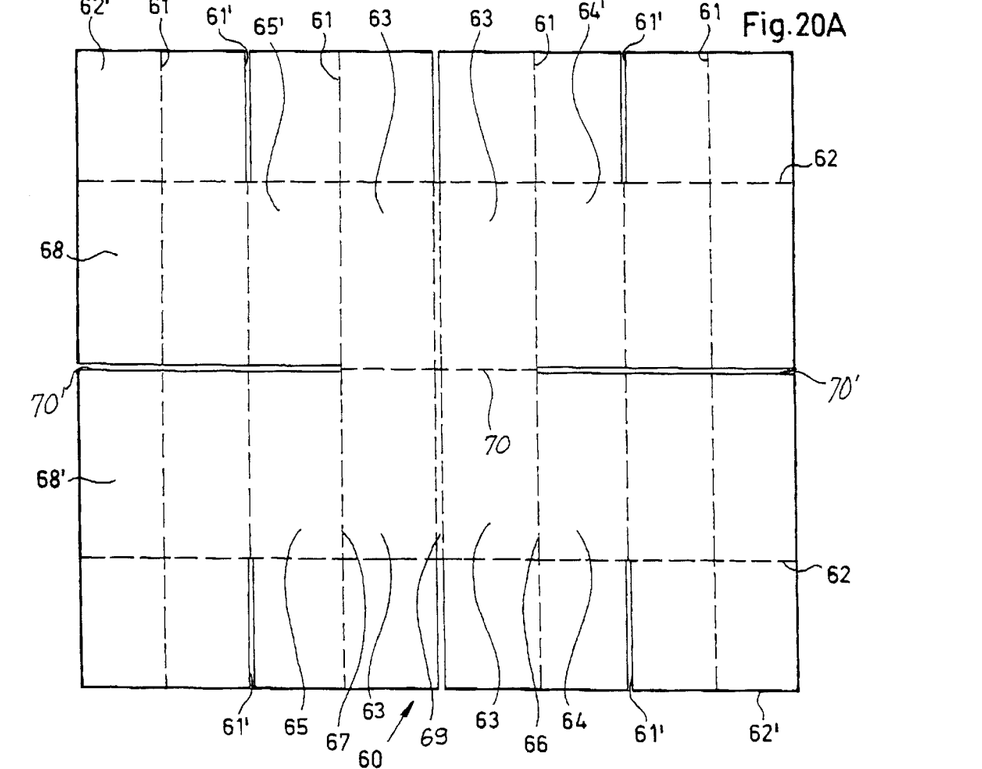
FIG. 20A shows a further preferred embodiment of a map with the inventive folding pattern in a view from above.
Figure 20B:
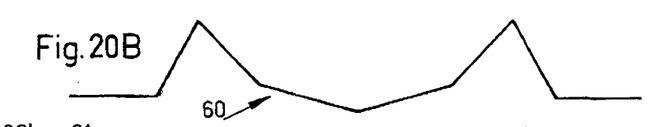
FIG. 20B shows the map shown in FIG. 20A in a side view.

FIGS. 18A, 18B to 20A, 20B show alternative embodiments of the map shown in FIGS. 17A and 17B, the reference signs being increased by the number 10 in FIGS. 18A and 18B over FIGS. 17A and 17B, increased by the number 20 in FIGS. 19A and 19B, and increased by the number 30 in FIGS. 20A and 20B.

The map shown in FIGS. 20A and 20B has a pattern of folding lines along which map 60 can be folded, two portions 64, 64' and 65, 65' connected via common center area 63 and each having a plurality of parallel folding lines 61 being disposed in a direction parallel to two first parallel limiting lines 66, 67 of center area 63, map 60 being foldable on successive lines 61 alternatingly in opposite directions so as to form a plurality of flaps, center area 63 being foldable along two perpendicular center folding lines 69, 70, and the flaps each having at least one folding line 61 extending parallel to one 69 of center lines 69, 70 of center area 63 and provided with slit 70' extending parallel to the other 70 of center lines 69, 70 of center area 63. Center line 69 of this map is formed as a strip, as indicated in the figure by the double line. In addition the map shown in FIG. 20A is provided in sections with slits 61' in the area of the portions located on the outside with respect to center line 70 so as to improve the foldability of this map. The distance of parallel folding lines 62 in this map is such that their distance from edge 62' of map 60 decreases.

Figure 30:
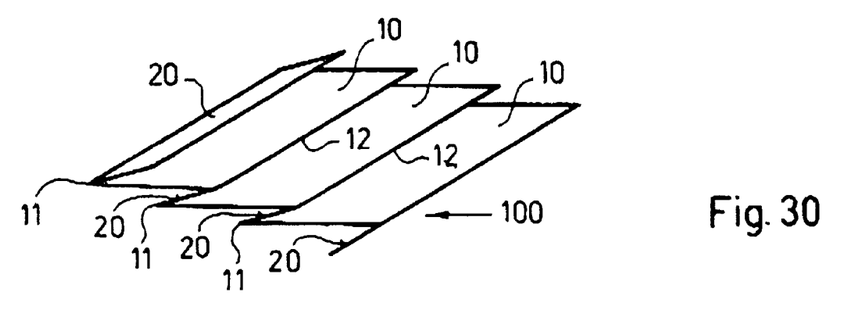
FIG. 30 shows in cross section a map which has been folded in accordance with the inventive pattern of folding lines.

Map 100 shown in FIG. 30 has a plurality of first equidistant parallel pairs of folding lines 11, 12 between which a plurality of areas 10 are formed. Between this plurality of areas 10 there are areas 20 limited by second equidistant parallel pairs of folding lines 12, 11. The spacing of pair of lines 12, 11 of areas 20 is half as great as the spacing of pair of lines 11, 12 of the limiting lines of areas 10. Areas 20 form folding flaps, additional information being given on the inside of these flaps on the geographical regions shown on adjacent areas 10.

Figure 40:
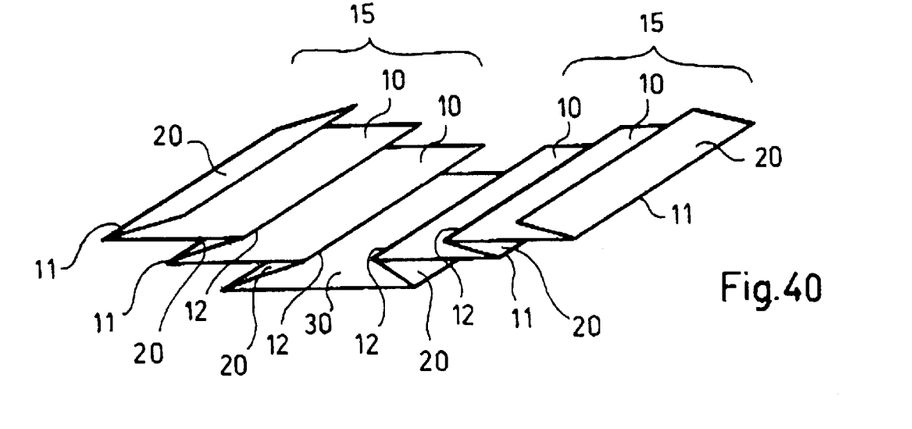
FIG. 40 shows in cross section a map which has been folded in accordance with the inventive pattern of folding lines.

The map shown in FIG. 40 has a plurality of first equidistant parallel pairs of folding lines 11, 12 between which a plurality of areas 10 are formed. Between this plurality of areas 10 there are areas 20 limited by second equidistant parallel pairs of folding lines 12, 11. The spacing of pair of lines 12, 11 of areas 20 is half as great as the spacing of pair of lines 11, 12 of the limiting lines of areas 10. Areas 20 form folding flaps, additional information being given on the inside of these flaps on the geographical regions shown on adjacent areas 20. Common center area 30 connects two portions 15 of areas 10 and areas 20.

What is claimed is:

1. A map comprising:
   a pattern of folding lines along which the map is capable of being folded;
   a common center area defined between two parallel limiting lines, wherein the center area is foldable along two parallel folding lines which are located within the two limiting lines and which define a strip surface therebetween when the center area is folded along said two parallel folding lines, wherein said strip surface extends from one of said two parallel folding lines to another of said two parallel folding lines; and
   at least two portions connected via the common center area, each portion having a plurality of parallel folding lines being disposed in a direction parallel to the two parallel limiting lines of the center area, the portions being foldable on successive folding lines alternating in opposite directions so as to form a plurality of flaps, wherein when folded along all folding lines the map has externally exposed surfaces and wherein the strip surface is at least one of the externally exposed surfaces, wherein a flap extends from one side of the strip surface, wherein another flap extends from the other side of the strip surface and wherein said strip surface is transverse to said flaps extending from the strip surface.

2. A map comprising:

a pattern of folding lines along which the map is capable of being folded;

a common center area defined between two parallel limiting lines, wherein the center area is foldable along two parallel folding lines which are located within the two limiting lines and which define a strip surface therebetween when the center area is folded along the folding, wherein said strip surface extends from one of said two parallel folding lines to another of said two parallel folding lines; and at least two portions connected via the common center area, each portion having a plurality of parallel folding lines being disposed in a direction parallel to the two parallel limiting lines of the center area, the portions being foldable on successive folding lines alternating in opposite directions so as to form a plurality of flaps, wherein when folded along all folded lines the map has externally exposed surfaces and wherein the strip surface is at least one of the externally exposed surfaces, wherein a flap extends from one side of the strip surface, wherein another flap extends from the other side of the strip surface and wherein said strip surface is transverse to said flaps extending from the strip surface wherein the length of the flaps decrease by a constant given amount with each flap as the distance from the center area increases.

* * * * *